L. L. TUFTS.
AUTOMOBILE SKID.
APPLICATION FILED JUNE 25, 1921.

1,389,400.

Patented Aug. 30, 1921.
2 SHEETS—SHEET 1.

Leighton L. Tufts INVENTOR.

BY
Gardner W. Pearce ATTORNEY.

L. L. TUFTS.
AUTOMOBILE SKID.
APPLICATION FILED JUNE 25, 1921.
1,389,400.
Patented Aug. 30, 1921.
2 SHEETS—SHEET 2.
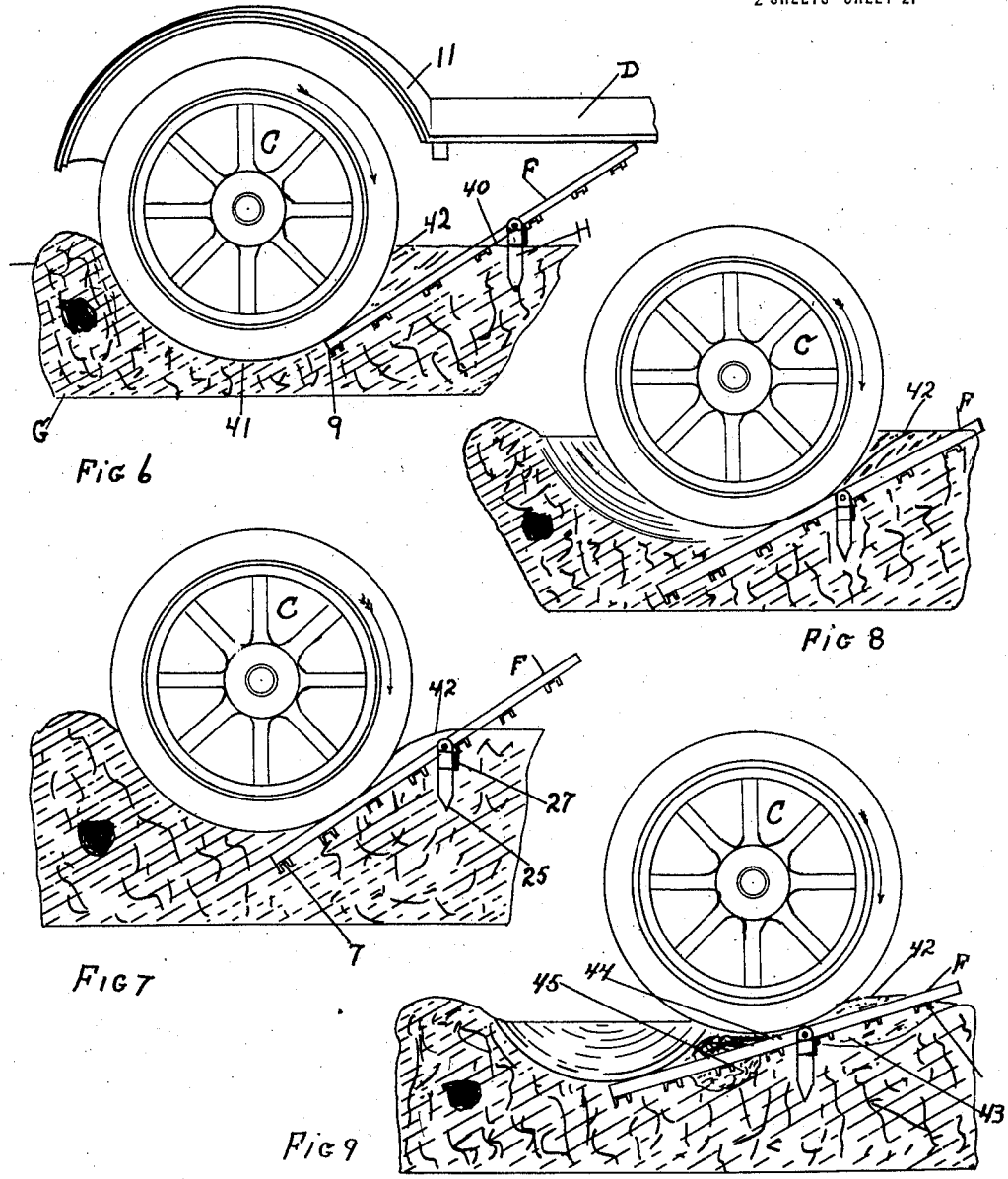

UNITED STATES PATENT OFFICE.

LEIGHTON L. TUFTS, OF MIDDLETON, MASSACHUSETTS.

AUTOMOBILE-SKID.

1,389,400.

Specification of Letters Patent.  Patented Aug. 30, 1921.

Application filed June 25, 1921. Serial No. 480,488.

*To all whom it may concern:*

Be it known that I, LEIGHTON L. TUFTS, a citizen of the United States, residing at Middleton, in the county of Essex and State of Massachusetts, have invented certain new and useful Improvements in Automobile-Skids, of which the following is a specification.

This invention relates to devices for extricating motor vehicles when their wheels have sunk into mud, sand, snow, or other similar material.

The objects of my invention are to provide a skid or mud dog for the above purpose, which is light and can readily be carried in an automobile.

I am aware that various devices for this purpose have been tried, but experience shows that a device which clings to the wheel and revolves with it is not satisfactory. It is necessary to have a device which can readily be put in place and which the action of the wheel will cause to function.

It is necessary that there should be a potentially large bearing surface, and that hard pan or hard ice should be reached without the device tipping over or collapsing.

My device is so constructed that the wheel of the motor vehicle, whether covered with a pneumatic tire or other material, will not slip lengthwise nor crosswise thereon and so that it will not itself slip nor get out of place when used in soft clay, snow, ice, grass, or other slippery or soft material.

My device in general consists of a rigid skeleton skid which, preferably, is provided with a folding spade so positioned that it will dig into the ground until it either reaches hard pan, or else carries the soft material back under the wheel, thereby lifting it.

In the drawings, Figure 1 is a diagrammatic side elevation of an automobile having a running board under which my device is fastened.

Figs. 6, 7, 8 and 9 show diagrammatically the various positions of an automobile wheel which has sunk in soft material, with the different positions of my skid when in use.

Figure 1:
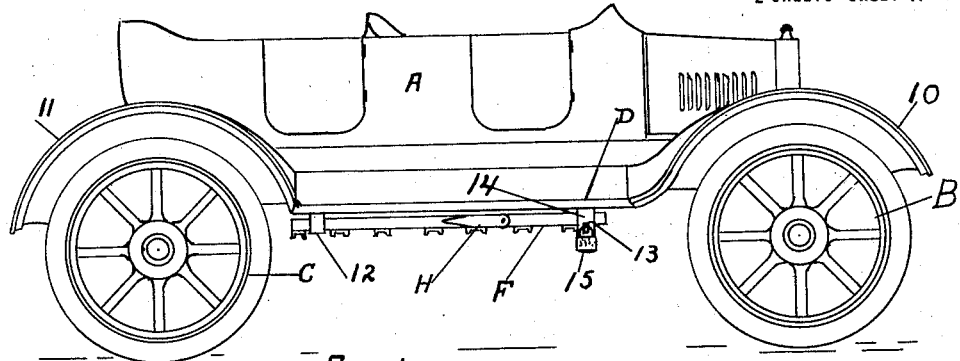

In the drawings, A represents or indicates the body of an automobile having front wheels B and rear wheels C, together with front fenders 10 and rear fenders 11 and a running board D between them, all of the usual construction.

My skid F with its spade H folded, is shown in position under the running board, being attached thereto by a strap 12 at the rear and being held in place at the front by an arm 13 and a pivoted clasp 14 locked together by a padlock 15. My skid for pleasure vehicles is preferably of such size in length and width that it can be so strapped under the running board D as to be out of the way. It also helps to give stiffness to the running board.

Figure 2:
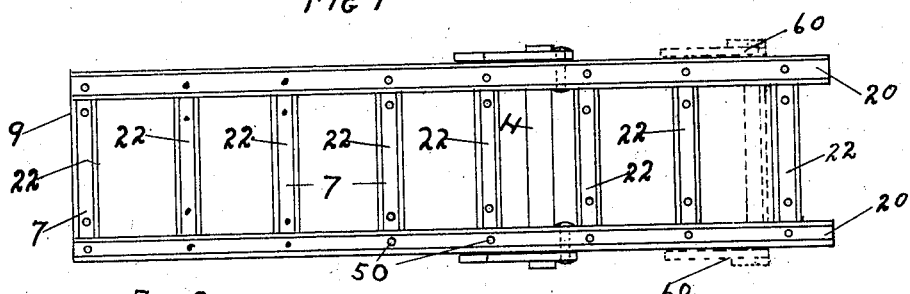
Fig. 2 is a plan view of my skid in its preferred form shown as detached from the automobile, with its spade folded. In dotted lines is also indicated a slight modification of the spade in a different position.

My preferred form of skid, as shown in Fig. 2, consists of parallel channeled metal side bars 20, 20, rigidly connected together by rigid cross bars 22, 22, preferably having channels 7 at the top and 8 at the bottom.

The cross bar 22 at the end 9, which may be considered the bottom, preferably connects the extreme ends of the side bars 20, 20.

Where the conditions are not very bad and where the wheel of an automobile has sunk only a little distance, my skid F, especially with the cross bars channeled at the top and bottom, will operate merely by pushing the end 9 under the wheel which has sunk, the same as is frequently done by the use of boards.

The top channels 7 give the wheel a grip which prevents it from slipping, and likewise the channels 8 help to dig into the ground so as to give a good grip thereon.

Figure 3:
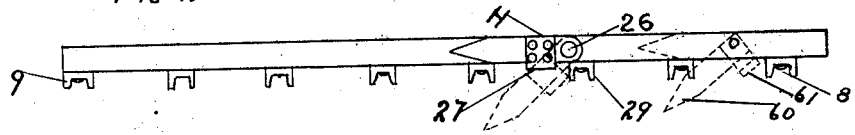
Fig. 3 is a side elevation of the same skid shown in Fig. 2. It also shows in dotted lines the position of a spade in different positions when unfolded.
Figures 4, 5:
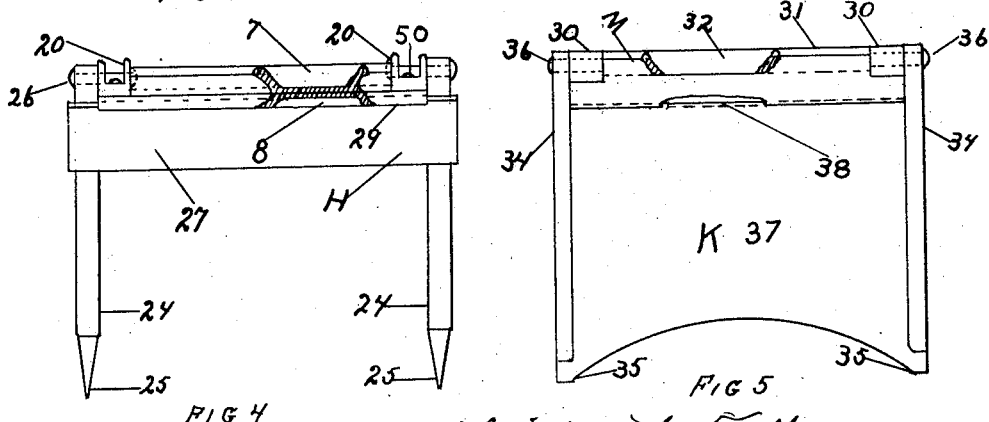
Fig. 4 is an enlarged end elevation from the right or top end of the skid shown in Figs. 2 and 3 with the spade unfolded.
Fig. 5 is a view similar to Fig. 4 of a slightly modified form of skid with a different form of spade.

I prefer, however, to use in connection with my skid a spade member indicated in Fig. 4 by H. This comprises side ribs 24, 24, pivoted by means of pivots 26, 26 which need not be particularly heavy or strong, to the side bars 20, 20, and the cross piece 27. Ribs 24, 24 are preferably pointed at their free ends 25, 25, and the cross piece 27 is so positioned that when folded as shown in Fig. 3, it comes under the side bars 20, 20, and when opened as shown in Fig. 6, it limits the backward movement of spade H so that it preferably projects at a somewhat acute angle toward the bottom 9 of the skid.

The operation is shown in Figs. 6, 7, 8 and 9, wherein G represents the ground and 40 the normal surface thereof. 41 represents the depression into which a rear wheel C has sunk, and 42 represents the crest or nose of the incline up which it is desired to drive wheel C.

Spade H is unfolded and the end 9 of skid F is pushed under the wheel as far as it will go, while still being under the running board D.

As shown in Fig. 7, as wheel C begins to revolve, it grips the channels 7 in the top of the skid and tends to suck it in. As it pulls it drives the ribs 24, 24 into the ground and also forces the cross piece 27 in the ground until all or either of them strike hard pan, hard ice or other resisting material. When this occurs, the skid stops, as shown in Fig. 7, and then, as shown in Fig. 8, the wheel C begins to rise thereon, traveling on a relatively firm platform.

In this process, the crest or nose 42 is generally pulled down so that the incline is not as severe as it is where a wheel with or without a chain or mat, spins around in the dirt, cutting out a hole substantially of its own size.

As shown in Fig. 9, if the ground is soft, the spade H is drawn back and carries with it the dirt, from the crest 42, leaving instead a channel 43, and this dirt is piled up at 44, and 45 underneath the wheel C, thus helping to lift the lower end of the skid F and the wheel C so that the wheel C can readily move off on a comparatively small incline.

In some cases I may prefer to use a different type of spade, as shown in Fig. 5, wherein the side ribs, represented by 34, 34, are connected throughout practically their whole length down to their points 35, 35, by a cross piece in the form of a web 37, and are pivoted to the side bars 30, 30 by pivots shown as 36, 36. This spade is indicated by K and it is shown as attached to a skid M having solid side bars 30, 30, and cross bars 31 having channels 32 at the top which may be rigidly attached to the side bars.

The cross bars and side bars may be connected together by rivets such as 50 or they may be welded together in a well known manner, or some may be riveted and others welded, as shown in Fig. 2.

As shown in Figs. 3 and 4, I prefer that the cross piece 27 of spade F should be so positioned that when spade H is unfolded it will strike one of the cross bars 22, such as 29, thus limiting the angle which it makes with side bars 20. However, as shown in Figs. 2 and 3, a spade having ribs indicated in the dotted lines at 60 with the cross piece 61 may be used, so positioned that cross piece 61 can strike the bottom of the side bars 20, 20 thereby limiting the movement. In the same way the top edge 38 of web 37 of spade K, as shown in Fig. 5, may be so positioned as to limit the angle of the spade by striking a cross bar 31.

It is obvious that the position of the spade with reference to the length of the skid may be varied at pleasure.

I also prefer to make the ribs of the spade of such width and allow its cross piece, such as 27, to project only far enough so that the whole top surface and bottom surface of the skid when the spade is folded will be even, whereby it can be more conveniently carried under the running board.

By channeling the side bars and providing that they project above the cross bars, any tendency of the wheels to slip sidewise off the skid is reduced or entirely obviated.

It is obvious that the skid can be pushed under the back of the driving wheel instead of under the front thereof if it is desired.

I claim:

1. A portable skid for motor vehicles of a size to fit under the running board made up of rigid parallel channeled metal side bars and rigid metal cross bars channeled at the top and bottom extending crosswise of the side bars and rigidly fixed thereto, and a spade member comprising pointed side ribs pivoted to and connected under the side bars by a cross piece which limits the movement of said spade.

2. A portable skid for motor vehicles made up of rigid parallel channeled metal side bars and rigid metal cross bars channeled at the top and bottom extending crosswise of the side bars and rigidly fixed thereto, and a spade member comprising pointed side ribs pivoted to and connected under the side bars by a cross piece which limits the movement of said spade.

3. A portable skid for motor vehicles made up of rigid parallel metal side bars and rigid metal cross bars channeled at the top extending crosswise of the side bars and rigidly fixed thereto, and a spade member comprising pointed side ribs pivoted to and connected under the side bars by a cross piece which limits the movement of said spade.

4. A portable skid for motor vehicles made up of rigid parallel metal side bars and rigid metal cross bars extending crosswise of the side bars and rigidly fixed thereto, and a spade member comprising pointed side ribs pivoted to and connected under the side bars by a cross piece which limits the movement of said spade.

5. A portable skid for motor vehicles made up of rigid parallel channeled metal side bars and rigid metal cross bars channeled at the top and bottom extending crosswise of the side bars and rigidly fixed thereto.

6. A portable skid for motor vehicles made up of rigid parallel metal side bars channeled at the top and rigid metal cross bars channeled at the top and bottom extending crosswise of the side bars, the upper faces of the cross bars being below the upper faces of the side bars and the lower faces of the cross bars extending below the lower faces of the side bars.

LEIGHTON L. TUFTS.